United States Patent
Li

(10) Patent No.: US 10,190,866 B2
(45) Date of Patent: Jan. 29, 2019

(54) FABRY-PEROT CAVITY, MANUFACTURING METHOD THEREOF, INTERFEROMETER AND MEASURING METHOD FOR WAVELENGTH OF LIGHT

(71) Applicant: BOE TECHNOLOGY GROUP CO., LTD., Beijing (CN)

(72) Inventor: Zhongxiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/679,241

(22) Filed: Aug. 17, 2017

(65) Prior Publication Data
US 2018/0066930 A1    Mar. 8, 2018

(30) Foreign Application Priority Data

Sep. 6, 2016  (CN) .......................... 2016 1 0805245

(51) Int. Cl.
*G01J 3/45* (2006.01)
*G01B 9/02* (2006.01)
(Continued)

(52) U.S. Cl.
CPC ........ *G01B 9/02011* (2013.01); *G02F 1/1339* (2013.01); *G02F 1/1393* (2013.01);
(Continued)

(58) Field of Classification Search
CPC ........... G01B 9/02011; G02F 1/133528; G02F 1/1339; G02F 1/1393; G02F 1/29;
(Continued)

(56) References Cited

U.S. PATENT DOCUMENTS

| 5,321,539 A | 6/1994 | Hirabayashi et al. |
| 8,125,633 B2 * | 2/2012 | Whelan ..................... G01J 3/28 356/300 |

(Continued)

FOREIGN PATENT DOCUMENTS

| CN | 205991777 U | 3/2017 |
| EP | 2416111 A1 | 2/2012 |

(Continued)

OTHER PUBLICATIONS

First Office Action for Chinese Patent Application No. 201610805245.0 dated Apr. 8, 2018.

*Primary Examiner* — Tarifur R Chowdhury
*Assistant Examiner* — Jonathon Cook
(74) *Attorney, Agent, or Firm* — Calfee, Halter & Griswold LLP

(57) ABSTRACT

The embodiments of the present disclosure relate to a Fabry-Perot cavity, a manufacturing method thereof, an interferometer and a measuring method for wavelength of light. The Fabry-Perot cavity includes two parallel substrates and a liquid crystal layer between the two parallel substrates, and a sealed cavity is defined between the two substrates; wherein the two substrates comprise a first substrate and a second substrate, light could enter through the first substrate and run out from the second substrate via the liquid crystal layer, and a deflection angle of the liquid crystal layer could be changed by applying various voltage between the two substrates.

18 Claims, 9 Drawing Sheets

(51) Int. Cl.
*G02F 1/1335* (2006.01)
*G02F 1/1339* (2006.01)
*G02F 1/139* (2006.01)
*G02F 1/29* (2006.01)

(52) U.S. Cl.
CPC .......... *G02F 1/133528* (2013.01); *G02F 1/29* (2013.01); *G02F 2202/28* (2013.01)

(58) Field of Classification Search
CPC .. G02F 1/1326; G02F 1/216; G02F 2001/213; G02F 2202/28; G01J 3/26; G01J 9/0246; G02B 26/001; G02B 5/284; G02B 6/29358
USPC ......................................................... 356/454
See application file for complete search history.

(56) References Cited

U.S. PATENT DOCUMENTS

| 2012/0268809 A1* | 10/2012 | Guo ........................ G02F 1/216 |
| | | 359/359 |
| 2016/0139390 A1* | 5/2016 | Bukshtab ................. A61B 3/13 |
| | | 351/206 |
| 2016/0146667 A1* | 5/2016 | August ................. G01J 3/1256 |
| | | 356/407 |
| 2018/0030348 A1* | 2/2018 | Saito .................. C09K 19/3402 |

FOREIGN PATENT DOCUMENTS

| IN | 2485DEL2011 | 3/2013 |
| JP | 58035424 A | 3/1982 |
| WO | 9919686 A1 | 4/1999 |

\* cited by examiner providing a liquid crystal layer between two parallel substrates to form a sealed cavity — 401

Fig. 4

FABRY-PEROT CAVITY, MANUFACTURING METHOD THEREOF, INTERFEROMETER AND MEASURING METHOD FOR WAVELENGTH OF LIGHT

CROSS REFERENCE TO RELATED APPLICATIONS

This application claims the priority to and the benefit of Chinese Patent Application No. 201610805245.0, filed on Sep. 6, 2016, which is incorporated herein by reference in its entirety.

TECHNICAL FIELD

The present disclosure relates generally to the optical field, and particularly to a Fabry-Perot cavity, a manufacturing method thereof, an interferometer and a measuring method for wavelength of light.

BACKGROUND

Fabry-Perot interferometer is a multiple beam interferometer, which could accurately measure wavelength of incident light and perform a wide role in scientific research, manufacture and teaching. The Fabry-Perot interferometer could be build by scientific research institutions, factories, schools or the like themselves for measuring wavelength of incident light due to its simple structure and easy-to-use.

The Fabry-Perot interferometer includes a Fabry-Perot cavity and a lens. FIG. 1 is a schematic diagram of a Fabry-Perot cavity in prior art. As shown in FIG. 1, the Fabry-Perot cavity includes two parallel glass substrates M and M' whose inner surfaces facing with each other are coated with a coating with high reflectivity. In practical use, an incident light enters through M, reflects between the two parallel glass substrates several times, and is focused by a convex lens (not shown in FIG. 1), finally multiple-beam interference fringes are generated. In order to meet interference condition, optical path difference between two adjacent light beams is required to be an integral multiple of wavelength. Consequently, optical path difference could be adjusted to meet interference condition of light beams with various wavelengths, from this the wavelength of incident light could be determined. A concrete method for adjusting optical path difference is to adjust a mechanical platform under the Fabry-Perot interferometer, thusly adjusting a distance between the two parallel glass substrates, and adjusting the optical path difference accordingly, which could allow light with various wavelengths to interfere.

SUMMARY

The embodiments of the present disclosure provide the following technical solution, so as to achieve an effect of the present disclosure.

In one aspect, the present disclosure provides a Fabry-Perot cavity, comprising:

two parallel substrates and a liquid crystal layer between the two parallel substrates, and a sealed cavity is defined between the two substrates;

wherein the two substrates comprise a first substrate and a second substrate, light could enter through the first substrate and run out from the second substrate via the liquid crystal layer, and a deflection angle of the liquid crystal layer could be changed by applying various voltage between the two substrates.

In one aspect, the present disclosure provides an interferometer, comprising a Fabry-Perot cavity and a lens at a light emergent side of the Fabry-Perot cavity;

wherein, the Fabry-Perot cavity, comprises:

two parallel substrates and a liquid crystal layer between the two parallel substrates, and a sealed cavity is defined between the two substrates;

wherein the two substrates comprise a first substrate and a second substrate, light could enter through the first substrate and run out from the second substrate via the liquid crystal layer, and a deflection angle of the liquid crystal layer could be changed by applying various voltage between the two substrates.

In one aspect, the present disclosure provides a manufacturing method of a Fabry-Perot cavity, comprising:

providing a liquid crystal layer between two parallel substrates to form a sealed cavity;

wherein, the two substrates comprise a first substrate and a second substrate, light could enter through the first substrate and run out from the second substrate via the liquid crystal layer, and a deflection angle of the liquid crystal layer could be changed by applying various voltage between the two substrates.

In one aspect, the present disclosure provides measuring method for wavelength of light, which could be performed by an interferometer, the interferometer comprises a Fabry-Perot cavity and a lens at a light emergent side of the Fabry-Perot cavity; the Fabry-Perot cavity comprises two parallel substrates and a liquid crystal layer between the two parallel substrates, and a sealed cavity is defined between the two substrates;

wherein the measuring method comprises:

applying a first voltage to one of the two substrates of the Fabry-Perot cavity, and applying a second voltage to the other one of the two substrates, wherein, under the first and second voltage, a standard light with standard wavelength enters into the Fabry-Perot cavity, and the intensity of the standard light focused by the lens reaches the maximum, wherein the first voltage is a fixed voltage, and the second voltage is an AC voltage;

entering the light to be measured into the Fabry-Perot cavity, detecting whether a changing curve of the intensity of light focused by the lens is in accordance with a changing curve of intensity of the standard light, wherein, when applying the first voltage to one of the two substrates of the Fabry-Perot cavity, and applying the second voltage to the other one of the two substrates, the standard light entering into the Fabry-Perot cavity is focused by the lens, the changing curve of intensity of the standard light refers to the changing curve of the intensity of the focused standard light;

if the changing curve of the intensity of light focused by the lens is in accordance with the changing curve of intensity of the standard light, the light to be measured could be determined as the standard light with the standard wavelength;

if the changing curve of the intensity of light focused by the lens is not in accordance with the changing curve of intensity of the standard light, continuously adjusting the second voltage until the light with maximum intensity is collected, and determining the wavelength of the light to be measured according to the maximum light intensity to which the light to be measured is corresponding.

BRIEF DESCRIPTION OF THE DRAWINGS

In order to clarify technical aspects in embodiments of the present disclosure more clearly, drawings which are needed for the description of the embodiments are briefly described hereinafter. It will be apparent that the drawings in the following description are merely some embodiments of the present disclosure. Other drawings may be obtained according to these drawings by those skilled in the art, without creative labor.

FIG. 4 is a flowchart of manufacturing method for a Fabry-Perot cavity according to an embodiment of the present disclosure;

FIG. 6-1 is a flowchart of measuring method for wavelength of light according to an embodiment of the present disclosure;

FIG. 6-2 is a plan view illustrating two substrates of the Fabry-Perot cavity according to another embodiment of the present disclosure;

FIG. 6-3 is a schematic diagram of an interferometer for measuring a wavelength of light according to an embodiment of the present disclosure; and FIG. 6-4 is a curve diagram of standard light intensity after focused by a liquid crystal Fresnel lens according to an embodiment of the present disclosure.

DETAILED DESCRIPTION

In order to make objects, technical solutions and advantages of the present invention more clear, hereinafter, the embodiments of the present invention will be further described in detail in conjunction with the accompanying drawings.

During implementation, the following problems in prior art are discovered by the inventor:

During adjusting the distance between the two parallel glass substrates in Fabry-Perot cavity of the Fabry-Perot interferometer, due to mechanical structure limit to adjustment accuracy, a parallel accuracy of the two parallel glass substrates is difficult to be measured and prone to change, which results in bad stability of the whole Fabry-Perot interferometer, and low measuring accuracy accordingly.

In order to solve the problem of bad stability of the whole Fabry-Perot interferometer, and low measuring accuracy accordingly, an embodiment of the present disclosure provides a Fabry-Perot cavity, a manufacturing method thereof, an interferometer and a measuring method for wavelength of light.

Figure 2:
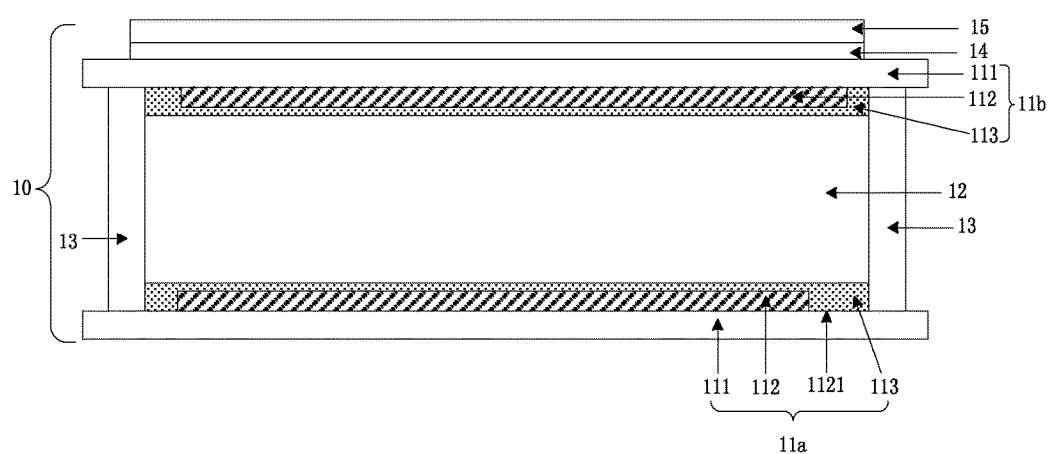
FIG. 2 is a schematic diagram of a Fabry-Perot cavity according to an embodiment of the present disclosure.

FIG. 2 is a schematic diagram of a Fabry-Perot cavity according to an embodiment of the present disclosure. The Fabry-Perot cavity 10 may include two parallel substrates and a liquid crystal layer 12 between the two parallel substrates, and a sealed cavity is defined between the two substrates.

The two substrates include a first substrate 11a and a second substrate 11b. Light enters through the first substrate 11a and runs out from the second substrate 11b via the liquid crystal layer 12. A deflection angle of the liquid crystal layer 12 could be changed by applying various voltage between the two substrates.

In conclusion, in the Fabry-Perot cavity according to an embodiment of the present disclosure, the refractive index of the liquid crystal layer between the two substrates could be changed by applying various voltage between the two substrates, such that the optical path difference of incident light could be changed, which allows light with various wavelengths to interfere. The parallel accuracy of the two substrates could be ensured and measuring accuracy could be improved without adjusting the distance between the two substrates.

Alternatively, as shown in FIG. 2, each substrate includes: a transparent substrate 111 and a metal layer 112 provided on the transparent substrate 111. The metal layers 112 of the two substrates are disposed facing with each other. At least one end of the transparent substrate 111 of the first substrate 11a is not covered by the metal layer 112 so as to define a transparent incidence opening 1121 through which light could enter.

In practice, in order to achieve an effective reflection of light in the Fabry-Perot cavity, the thickness of the liquid crystal layer may be 10 μm, the incidence angle of light entering through the transparent incidence opening is less than 5°.

In the embodiment of the present disclosure, the metal layers disposed on the two substrates have high reflectivity, such as, the reflectivity of the metal layer is larger than 95% and less than 99%. The metal layer with a reflectivity larger than 95% and less than 99% may allow light incident from the first substrate to reflect between the two substrates several times. Alternatively, the material of the metal layers 112 may be aluminum. Aluminum has high reflectivity and high electrical conductivity. Because of the high reflectivity, the incidence light may reflect between the two substrates several times; because of the high electrical conductivity, various voltage signals may be applied between the two substrates, such that the reflective index of the liquid crystal layer between the two substrates may be controlled accordingly. The material of the metal layer may also be other one with high reflectivity and high electrical conductivity, which is not limited by the embodiment of the present disclosure.

Alternatively, as shown in FIG. 2, each substrate further includes: a liquid crystal supporting layer 113 disposed on the metal layer 112, which allows liquid crystal molecules to be arranged regularly, thusly ensuring an effective adjustment of the liquid crystal molecules.

Further, the liquid crystal supporting layer 113 may wrap the metal layer due to the transparent incidence opening uncovered by the metal layer in the first substrate, which could allow liquid crystal molecules to be arranged regularly. For example, the liquid crystal supporting layer 113 may be a resin layer with relative large thickness for wrapping the metal layer and supporting the liquid crystal molecules, thusly ensuring an effective adjustment of the liquid crystal molecules. Alternatively, in an electrically controlled birefringence (ECB for short) mode, the liquid crystal molecules in the liquid crystal layer are easy to be controlled, and have a high refraction accuracy, therefore, in the embodiment of the present disclosure, the liquid crystal layer may be in ECB mode.

Alternatively, as shown in FIG. 2, the sealed cavity further includes a sealant 13 at periphery area of the liquid crystal layer 12 between the two substrates. The periphery area may be an annular area on which the sealant 13 is coated. Due to the sealant 13, the liquid crystal molecules are prevented from leaking out of the Fabry-Perot cavity, thusly achieving an effective seal of the Fabry-Perot cavity.

Alternatively, as shown in FIG. 2, a polarizer 15 is provided at a light emergent side of the second substrate 11b, which may stick on the second substrate 11b. In practice, an Optical Clear Resin (OCR for short) adhesive 14 may be provided at the light emergent side of the transparent substrate 111 of the second substrate 11b through which the polarizer 15 is adhered. The OCR adhesive 14 is designed to be a special adhesive applicable for adhering transparent optical element, which could adhere both the polarizer and lens for focusing light.

During measuring the wavelength of the incidence light by the Fabry-Perot cavity as shown in FIG. 2, light runs out from the second substrate 11b and then goes through the polarizer 15, which allows the light vibrating in a certain direction (i.e., a linearly polarized light) to pass through.

In conclusion, in the Fabry-Perot cavity according to an embodiment of the present disclosure, the refractive index of the liquid crystal layer between the two substrates could be changed by applying various voltage between the two substrates, such that the optical path difference of incident light could be changed, which allows light with various wavelengths to interfere. The parallel accuracy of the two substrates could be ensured and measuring accuracy could be improved without adjusting the distance between the two substrates.

In an embodiment of the present disclosure, an interferometer is provided for measuring wavelength of an incidence light. The interferometer may include the Fabry-Perot cavity according to the embodiment of the present disclosure and a lens at a light emergent side of the Fabry-Perot cavity. The lens may stick on the light emergent side of the Fabry-Perot cavity. The Fabry-Perot cavity may be the one as shown in FIG. 2.

In practice, all of the light running out from the light emergent side of the Fabry-Perot cavity will vibrate in a certain direction, and then interference will occur after the light is focused through the lens. Alternatively, the lens may be Fresnel lens with low thickness, which could adhere with the Fabry-Perot cavity in less difficulty. Alternatively, the Fresnel lens may be a liquid crystal lens, i.e., liquid crystal Fresnel lens. The focal distance of the Fresnel lens could be adjusted by electrodes disposed at both sides of the Fresnel lens, which will obtain a convenient and quick focus.

Figure 3:
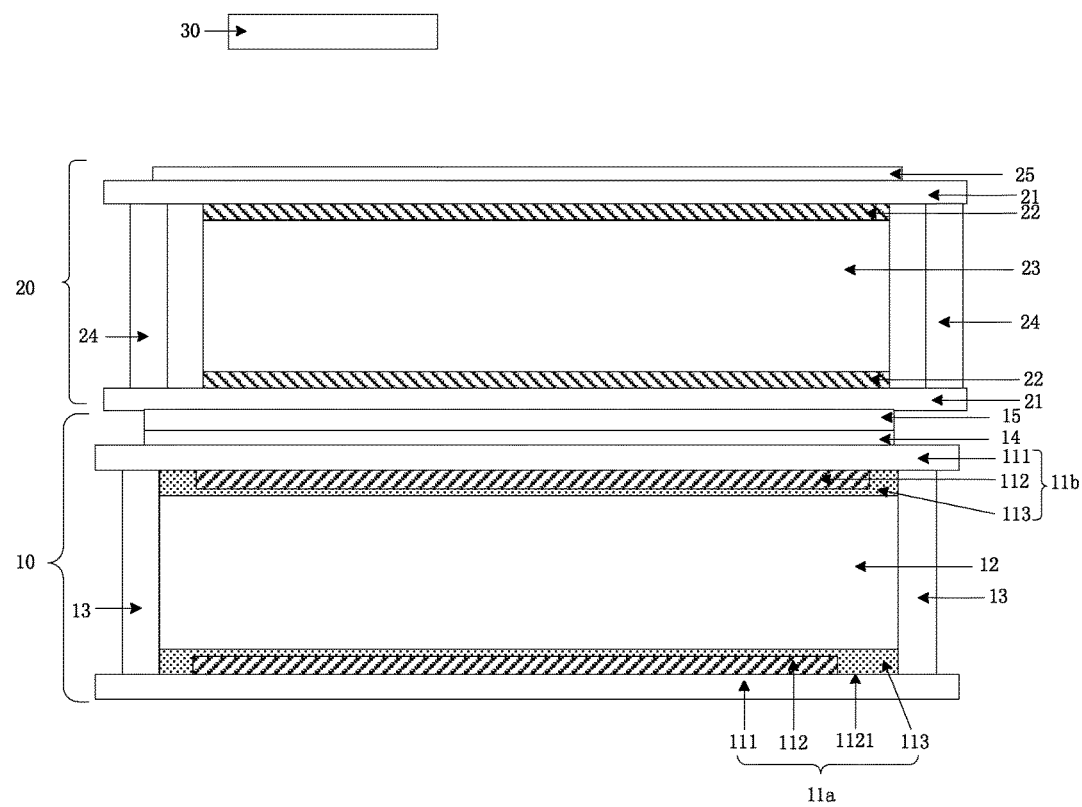
FIG. 3 is a schematic diagram of an interferometer according to an embodiment of the present disclosure.

In particular, as shown in FIG. 3, which is a schematic diagram of an interferometer according to an embodiment of the present disclosure, the interferometer is used for measuring the wavelength of the incidence light. The interferometer may include a Fabry-Perot cavity 10, a Fresnel lens 20 and a detecting platform 30. The Fresnel lens 20 includes a transparent substrate 21, electrodes 22, a liquid crystal layer 23, a sealant 24 and a polarizer 25. The detecting platform 30 may be a platform where a detecting port of a light intensity detector (not shown in FIG. 3) is disposed. The light intensity detector may have display function, such as provided with a LCD. The detecting port of the light intensity detector could detect the light intensity of the light focused by the liquid crystal Fresnel lens, and display on the LCD. During continuous adjustment of voltage between the two substrates in the Fabry-Perot cavity, a series of changes of light intensity could be detected by the light intensity detector, and displayed on the LCD in a form of curve diagram.

In the present embodiment of the present disclosure, the transparent substrate 21 and the transparent substrate 111 of the Fabry-Perot cavity 10 may be formed in the same material, the sealant 24 and the sealant 13 of the Fabry-Perot cavity 10 may be formed in the same material, and the polarizer 25 and the polarizer 15 of the Fabry-Perot cavity 10 may be formed in the same material, and have the same polarization direction.

In order to facilitate understanding, the working principle of the Fabry-Perot cavity of the present embodiment of the present disclosure is explained as follows. An interference maximum of the emergent light from the Fabry-Perot cavity should satisfy a maximum formula as follow:

$$2nh \cos \theta = m\lambda$$

In particular, n refers to the refractive index, h refers to the distance between the two substrates in the Fabry-Perot cavity, θ refers to the incidence angle of the incidence light, λ refers to the wavelength of the incidence light, and m is a positive integer (i.e., m=1, 2, 3 . . . ). The interference maximum of the emergent light from the Fabry-Perot cavity means that the light intensity detected by the detecting platform reaches a maximum after the emergent light is focused by the lens.

Based on the above formula, it can be seen that the interference maximum of the emergent light from the Fabry-Perot cavity is proportional to the refractive index n and the distance h. In prior art, the refractive index n and incidence angle θ of the incidence light are fixed, and various optical path differences could be obtained by changing the distance h. However, in the present disclosure, the thickness of the Fabry-Perot cavity is fixed, and the incidence angle of the incidence light could be set to be fixed, which is equivalent to that the incidence angle θ and distance h are fixed, such that various optical path differences could be obtained by changing the refractive index n of the liquid crystal layer.

In conclusion, in the interferometer according to an embodiment of the present disclosure, the refractive index of the liquid crystal layer between the two substrates could be changed by applying various voltage between the two substrates, such that the optical path difference of incident light could be changed, which allows light with various wavelengths to interfere. The parallel accuracy of the two substrates could be ensured and measuring accuracy could be improved without adjusting the distance between the two substrates.

In an embodiment of the present disclosure, a manufacturing method of a Fabry-Perot cavity is provided.

Figures 1, 6:
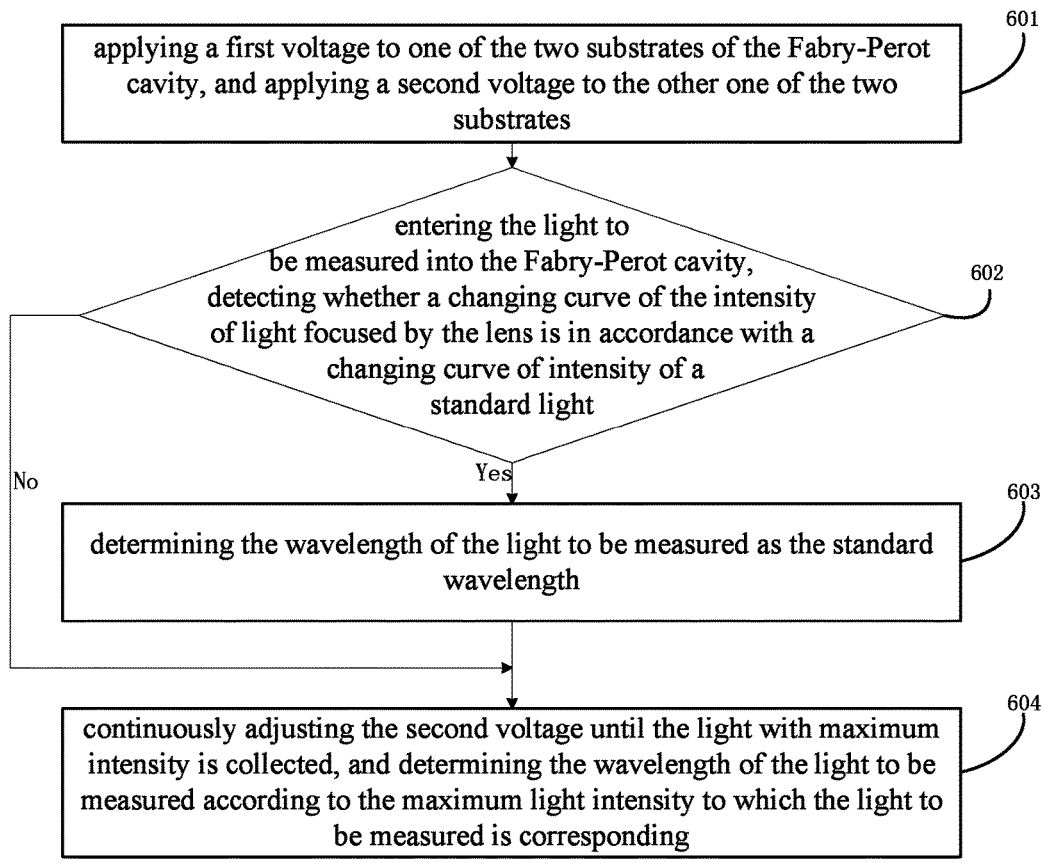
Figures 2, 6:
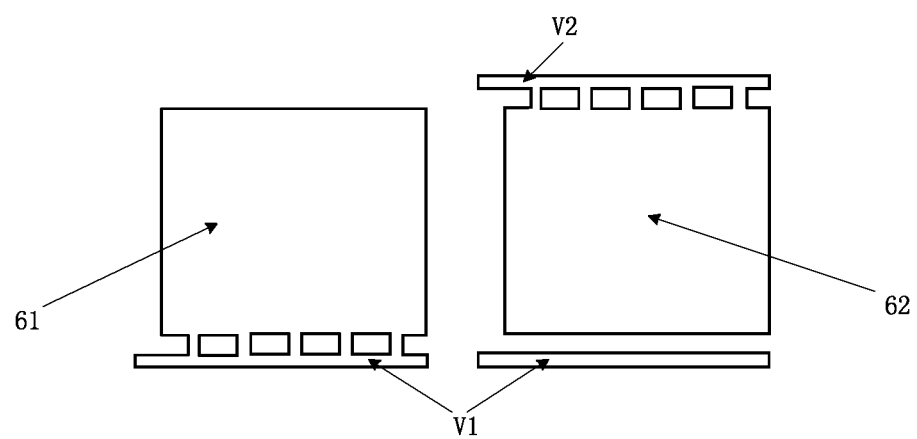
Figures 3, 6:
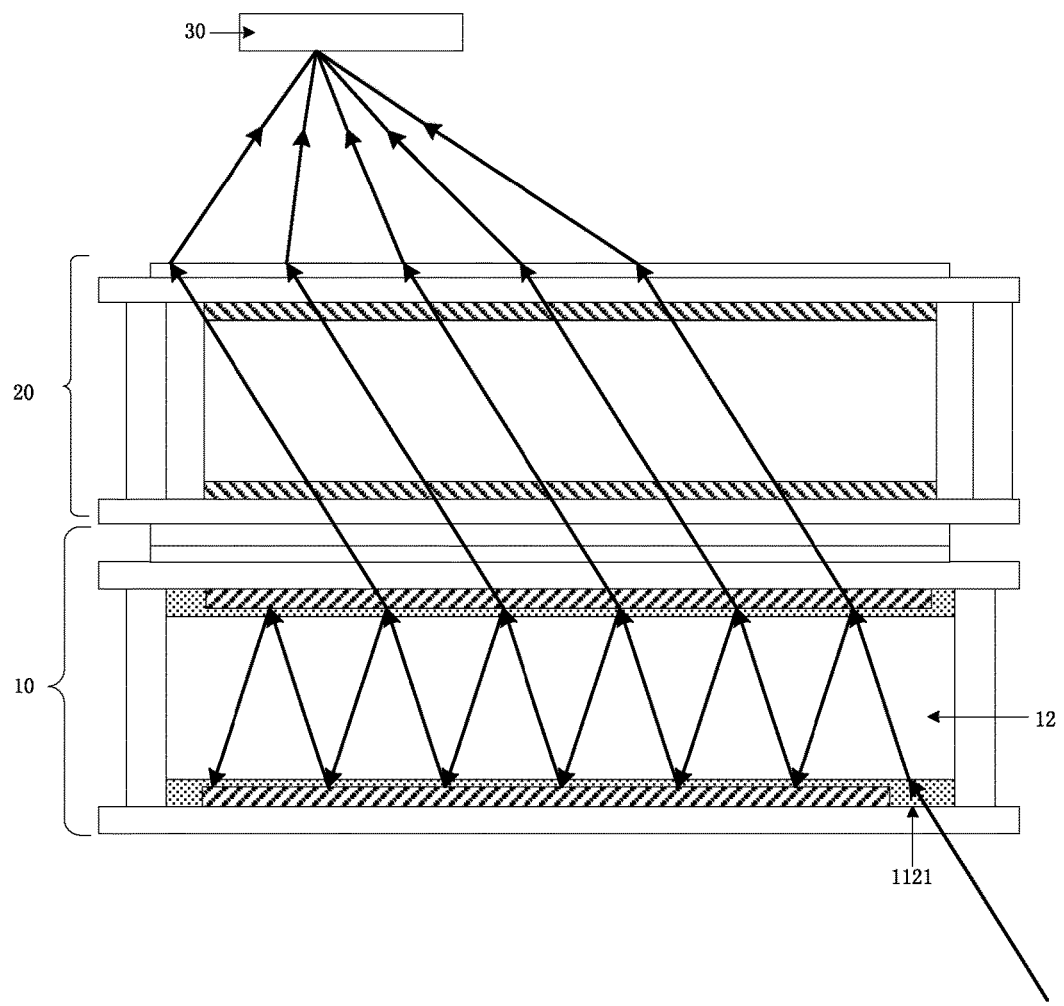
Figures 4, 6:
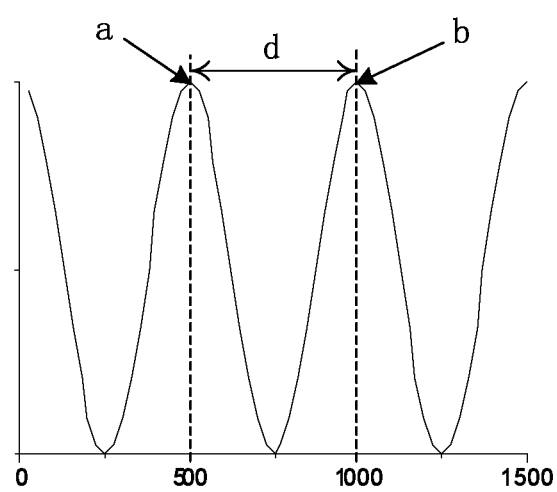

FIG. 4 is a flowchart of manufacturing method for a Fabry-Perot cavity according to an embodiment of the present disclosure, which is used for manufacturing the Fabry-Perot cavity according to the embodiment of the present disclosure. The manufacturing method of a Fabry-Perot cavity includes the steps as follows:

Step 401, providing a liquid crystal layer between two parallel substrates to form a sealed cavity.

Wherein, the two substrates include a first substrate and a second substrate. Light enters through the first substrate and runs out from the second substrate via the liquid crystal layer. A deflection angle of the liquid crystal layer could be changed by applying various voltage between the two substrates.

In conclusion, in the manufacturing method for a Fabry-Perot cavity according to an embodiment of the present disclosure, the refractive index of the liquid crystal layer between the two substrates could be changed by applying various voltage between the two substrates, such that the optical path difference of incident light could be changed, which allows light with various wavelengths to interfere. The parallel accuracy of the two substrates could be ensured and measuring accuracy could be improved without adjusting the distance between the two substrates.

Figure 5:
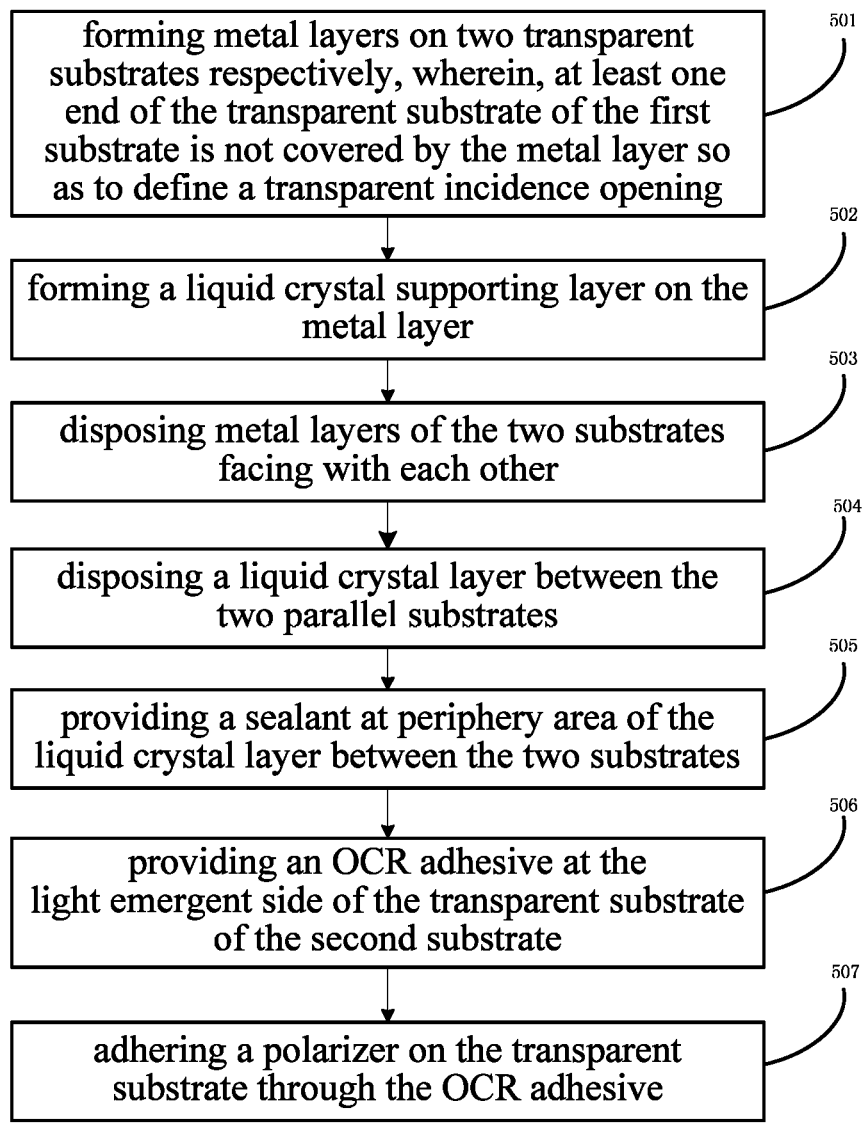
FIG. 5 is a flowchart of manufacturing method for a Fabry-Perot cavity according to another embodiment of the present disclosure.

FIG. 5 is a flowchart of manufacturing method for a Fabry-Perot cavity according to another embodiment of the present disclosure, which is used for manufacturing the Fabry-Perot cavity according to the embodiment of the present disclosure. The manufacturing method of a Fabry-Perot cavity includes the steps as follows:

Step 501, forming metal layers on two transparent substrates respectively, wherein, at least one end of the transparent substrate of the first substrate is not covered by the metal layer so as to define a transparent incidence opening.

For example, the metal layers disposed on the transparent substrates of the first and second substrates have high reflectivity, such as, the reflectivity of the metal layer may be larger than 95% and less than 99%. At least one end of the transparent substrate of the first substrate is not covered by the metal layer so as to define the transparent incidence opening through which light could enter. The transparent substrate may be a glass substrate, and the material of the metal layer may be aluminum.

Step 502, forming a liquid crystal supporting layer on the metal layer.

For example, the liquid crystal supporting layer may wrap the metal layer due to the transparent incidence opening uncovered by the metal layer in the first substrate, which could allow liquid crystal molecules to be arranged regularly. For example, the liquid crystal supporting layer may be resin layer with relative large thickness for wrapping the metal layer and supporting the liquid crystal molecules, thusly ensuring an effective adjustment of the liquid crystal molecules.

Step 503, disposing metal layers of the two substrates facing with each other.

In particular, the metal layers of the two substrates are disposed facing with each other, and the two substrates are parallel with each other. The incident light passing through the transparent incidence opening of the first substrate reflects between the two substrates several times, finally runs out from the second substrate.

Step 504, disposing a liquid crystal layer between the two parallel substrates.

For example, various voltage signals may be applied to the metal layers in the first and second substrates respectively, such that the reflective index of the liquid crystal layer may be further adjusted, such that the optical path difference could be changed after the light enters through the incidence opening. Alternatively, in an ECB mode, the liquid crystal molecules in the liquid crystal layer are easy to be controlled, and have a high refraction accuracy, therefore, in the embodiment of the present disclosure, the liquid crystal layer may be in ECB mode.

Step 505, providing a sealant at periphery area of the liquid crystal layer between the two substrates.

For example, the sealant is provided at periphery area of the liquid crystal layer between the two substrates. The periphery area may be an annular area on which the sealant is coated so as to form a sealed cavity for sealing the liquid crystal layer, which could prevent the liquid crystal molecules from leaking out of the Fabry-Perot cavity.

Step 506, providing an OCR adhesive at the light emergent side of the transparent substrate of the second substrate.

In particular, the OCR adhesive is designed to be a special adhesive applicable for adhering transparent optical element, which could adhere both the polarizer and liquid crystal Fresnel lens mentioned in the embodiment of the present disclosure.

Step 507, adhering a polarizer on the transparent substrate through the OCR adhesive.

In an embodiment of the present disclosure, light runs out from the second substrate and then goes through the polarizer. The polarizer allows the light vibrating in a certain direction (i.e., a linearly polarized light) to pass through.

In conclusion, in the manufacturing method for a Fabry-Perot cavity according to an embodiment of the present disclosure, the refractive index of the liquid crystal layer between the two substrates could be changed by applying various voltage between the two substrates, such that the optical path difference of incident light could be changed, which allows light with various wavelengths to interfere. The parallel accuracy of the two substrates could be ensured and measuring accuracy could be improved without adjusting the distance between the two substrates.

Figure 1:
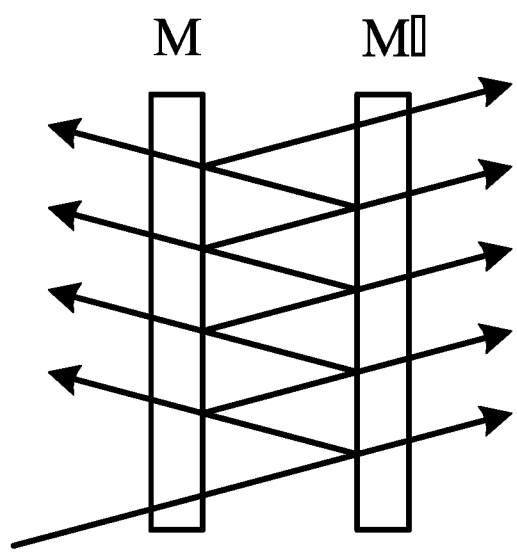
FIG. 1 is a schematic diagram illustrating a Fabry-Perot cavity in prior art.

FIG. 6-1 is a flowchart of measuring method for wavelength of light according to an embodiment of the present disclosure. The wavelength of incident light may be measured by the interferometer according to an embodiment of the present disclosure. The measuring method for wavelength of light includes the steps as follows:

Step 601, applying a first voltage to one of the two substrates of the Fabry-Perot cavity, and applying a second voltage to the other one of the two substrates.

Wherein, under the first and second voltage, the standard light with standard wavelength enters into the Fabry-Perot cavity, and the intensity of the standard light focused by the lens reaches the maximum. The first voltage is fixed voltage, e.g. 0v, and the second voltage is AC voltage.

Alternatively, applying the first voltage to one of the substrates; entering the standard light with standard wavelength into the Fabry-Perot cavity, applying an AC voltage different from the first voltage to the other substrate until the detected intensity of the standard light focused by the lens reaches the maximum. The AC voltage applied to the other substrate is determined as the second voltage when the standard light is corresponding to the maximum light intensity. For example, the wavelength of the standard light is 500 nm.

For example, as shown in FIG. 6-2 which is a plan view illustrating two substrates of the Fabry-Perot cavity according to another embodiment of the present disclosure, the first substrate in the Fabry-Perot cavity may be any one of the two substrates 61 and 62 as shown in FIG. 6-2, and the second substrate in the Fabry-Perot cavity is the other one accordingly. As shown in FIG. 6-2, the first voltage V1 may be applied to the substrate 61, which is a fixed voltage, and the second voltage V2 may be applied to the substrate 62, which is an AC voltage. Voltage difference is occurred between the two substrates 61 and 62, which allows to further adjust the refractive index of the liquid crystal layer.

In practice, as shown in FIG. 6-3 which is a schematic diagram of an interferometer for measuring a wavelength of incident light according to an embodiment of the present disclosure, the thickness of the liquid crystal layer 12 may be 10 μm, and the incidence angle of standard light entering through the transparent incidence opening 1021 is less than 5°. For example, if serving as a light to be measured, the incidence angle of the incidence light should be less than 5°. Applying the first voltage to one of the substrates, applying an AC voltage different from the first voltage to the other substrate until the intensity of the light focused by the liquid crystal Fresnel lens 20 detected by the detecting platform 30 reaches the maximum. At this point, the AC voltage applied to the other substrate is determined as the second voltage.

Step 602, entering the light to be measured into the Fabry-Perot cavity, detecting whether a changing curve of the intensity of light focused by the lens is in accordance with a changing curve of intensity of a standard light, if yes, performing Step 603, if not, performing Step 604.

When applying the first voltage to one of the two substrates of the Fabry-Perot cavity, and applying the second voltage to the other one of the two substrates, the standard light entering into the Fabry-Perot cavity is focused by the lens. The changing curve of intensity of the standard light refers to the changing curve of the intensity of the focused standard light.

Please refer to the aforesaid maximum formula:

$$2nh \cos \theta = m\lambda$$

In an embodiment of the present disclosure, the thickness of the Fabry-Perot cavity is fixed, and the incidence angle of the incidence light could be set to be fixed, which is equivalent to that the incidence angle $\theta$ and distance h are fixed. The first and second voltage are applied to the two substrates of the Fabry-Perot cavity respectively to change the refractive index n of the liquid crystal layer, such that the intensity of the emergent light focused by the lens detected by the detecting platform reaches the maximum intensity.

As shown in FIG. 6-4 which is a curve diagram of standard light intensity after focused by a liquid crystal Fresnel lens according to an embodiment of the present disclosure, the abscissa denotes optical path difference (in nm), and the ordinate denotes light intensity. As shown in FIG. 6-4, points a and b denote two adjacent points with maximum light intensity, and the optical path difference d between points a and b denotes the wavelength of the standard light, i.e., 500 nm.

Step 603, determining the wavelength of the light to be measured as the standard wavelength.

Alternatively, the light to be measured may be the standard light with standard wavelength. Under this condition, the wavelength of the light to be measured could be determined directly as the standard wavelength without measuring the wavelength. In practice, when the light to be measured enters into the Fabry-Perot cavity, and the changing curve of the intensity of light focused by the lens is detected to be in accordance with the changing curve of intensity of the standard light, the light to be measured could be determined as the standard light with the standard wavelength, accordingly, the wavelength of the light to be measured could be determined.

Step 604, continuously adjusting the second voltage until the light with maximum intensity is collected, and determining the wavelength of the light to be measured according to the maximum light intensity to which the light to be measured is corresponding.

Alternatively, when the light to be measured enters into the Fabry-Perot cavity, and the changing curve of the intensity of light focused by the lens is detected to be not in accordance with the changing curve of intensity of the standard light, the light to be measured could not be determined as the standard light with the standard wavelength. Under this condition, the second voltage should be adjusted further until the light with maximum intensity is collected, at this point, a new changing curve of the intensity of light is obtained. Based on this, calculating the distance between the two adjacent points denoting light intensity maximum, i.e., the wavelength of the light to be measured.

In practice, the measuring method for wavelength of light according to an embodiment of the present disclosure may further include: applying a fixed voltage to one of the substrates in the Fabry-Perot cavity, and applying an AC voltage different from the first voltage to the other substrate until the intensity of the light focused by the lens detected by the detecting platform reaches the maximum, at this point, a changing curve of the intensity of light is obtained. Based on this, calculating the distance between the two adjacent points denoting light intensity maximum, i.e., the wavelength of the light to be measured.

In conclusion, in the measuring method for wavelength of light according to an embodiment of the present disclosure, the refractive index of the liquid crystal layer between the two substrates could be changed by applying various voltage between the two substrates, such that the optical path difference of incident light could be changed, which allows light with various wavelengths to interfere. The parallel accuracy of the two substrates could be ensured and measuring accuracy could be improved without adjusting the distance between the two substrates.

In conclusion, in the Fabry-Perot cavity, a manufacturing method thereof, an interferometer and a measuring method for wavelength of light according to an embodiment of the present disclosure, the refractive index of the liquid crystal layer between the two substrates could be changed by applying various voltage between the two substrates, such that the optical path difference of incident light could be changed, which allows light with various wavelengths to interfere. The parallel accuracy of the two substrates could be ensured and measuring accuracy could be improved without adjusting the distance between the two substrates.

It should be understood for those skilled in the art that a part of or the whole of steps in the embodiments may be implemented by hardware, or by programs instructing the related hardware. The programs may be stored in a computer readable storage medium. The storage medium described as above may be a read-only memory, a magnetic disc, an optical disc or the like.

The foregoing are merely preferred embodiments of the present disclosure and are not intended to limit the present disclosure. Those skilled in the art may conceive variations, equivalent substitutions or modifications within the spirit and principle of the present disclosure should be covered by the protection scope of the present disclosure.

What is claimed is:

1. A Fabry-Perot cavity, comprising:
   two parallel substrates and a liquid crystal layer between the two parallel substrates, and a sealed cavity is defined between the two substrates;
   wherein the two substrates comprise a first substrate and a second substrate, light operably enters through the first substrate and runs out from the second substrate via the liquid crystal layer, and a deflection angle of the liquid crystal layer is operably changed by applying various voltage between the two substrates,
   wherein each substrate comprises a transparent substrate and a metal layer provided on the transparent substrate; the metal layers of the two substrates are disposed facing with each other; at least one end of the transparent substrate of the first substrate is not covered by the metal layer so as to define a transparent incidence opening.

2. The Fabry-Perot cavity according to claim 1, wherein the reflectivity of the metal layer is larger than 95% and less than 99%.

3. The Fabry-Perot cavity according to claim 2, wherein the material of the metal layer is aluminum.

4. The Fabry-Perot cavity according to claim 1, wherein each substrate further comprises a liquid crystal supporting layer disposed on the metal layer.

5. The Fabry-Perot cavity according to claim 4, wherein the liquid crystal supporting layer is a resin layer.

6. The Fabry-Perot cavity according to claim 1, wherein the sealed cavity further comprises a sealant at periphery area of the liquid crystal layer between the two substrates.

7. The Fabry-Perot cavity according to claim 1, wherein a polarizer is provided at a light emergent side of the second substrate.

8. The Fabry-Perot cavity according to claim 7, wherein an OCR adhesive is provided at the light emergent side of the transparent substrate of the second substrate through which the polarizer is adhered.

9. The Fabry-Perot cavity according to claim 1, wherein the liquid crystal layer is the one in ECB mode.

10. An interferometer, comprising a Fabry-Perot cavity and a lens at a light emergent side of the Fabry-Perot cavity; wherein, the Fabry-Perot cavity, comprises:
two parallel substrates and a liquid crystal layer between the two parallel substrates, and a sealed cavity is defined between the two substrates;
wherein the two substrates comprise a first substrate and a second substrate, light operably enters through the first substrate and runs out from the second substrate via the liquid crystal layer, and a deflection angle of the liquid crystal layer is operably changed by applying various voltage between the two substrates,
wherein each substrate comprises a transparent substrate and a metal layer provided on the transparent substrate; the metal layers of the two substrates are disposed facing with each other; at least one end of the transparent substrate of the first substrate is not covered by the metal layer so as to define a transparent incidence opening.

11. The interferometer according to claim 10, wherein each substrate further comprises a liquid crystal supporting layer disposed on the metal layer.

12. The interferometer according to claim 10, wherein the sealed cavity further comprises a sealant at periphery area of the liquid crystal layer between the two substrates.

13. The interferometer according to claim 10, wherein a polarizer is provided at a light emergent side of the second substrate.

14. The interferometer according to claim 13, wherein an OCR adhesive is provided at the light emergent side of the transparent substrate of the second substrate through which the polarizer is adhered.

15. The interferometer according to claim 10, wherein the liquid crystal layer is the one in ECB mode.

16. A manufacturing method of a Fabry-Perot cavity, comprising:
providing a liquid crystal layer between two parallel substrates to form a sealed cavity;
wherein, the two substrates comprise a first substrate and a second substrate, light operably enters through the first substrate and runs out from the second substrate via the liquid crystal layer, and a deflection angle of the liquid crystal layer is operably changed by applying various voltage between the two substrates,
wherein each substrate comprises a transparent substrate and a metal layer provided on the transparent substrate; the metal layers of the two substrates are disposed facing with each other; at least one end of the transparent substrate of the first substrate is not covered by the metal layer so as to define a transparent incidence opening.

17. A measuring method for wavelength of light, which is operably performed by an interferometer, the interferometer comprises a Fabry-Perot cavity and a lens at a light emergent side of the Fabry-Perot cavity; the Fabry-Perot cavity comprises two parallel substrates and a liquid crystal layer between the two parallel substrates, and a sealed cavity is defined between the two substrates;
wherein the measuring method comprises:
applying a first voltage to one of the two substrates of the Fabry-Perot cavity, and applying a second voltage to the other one of the two substrates, wherein, under the first and second voltage, a standard light with standard wavelength enters into the Fabry-Perot cavity, and the intensity of the standard light focused by the lens reaches the maximum, wherein the first voltage is a fixed voltage, and the second voltage is an AC voltage;
entering the light to be measured into the Fabry-Perot cavity, detecting whether a changing curve of the intensity of light focused by the lens is in accordance with a changing curve of intensity of the standard light, wherein, when applying the first voltage to one of the two substrates of the Fabry-Perot cavity, and applying the second voltage to the other one of the two substrates, the standard light entering into the Fabry-Perot cavity is focused by the lens, the changing curve of intensity of the standard light refers to the changing curve of the intensity of the focused standard light;
if the changing curve of the intensity of light focused by the lens is in accordance with the changing curve of intensity of the standard light, the light to be measured is operably determined as the standard light with the standard wavelength;
if the changing curve of the intensity of light focused by the lens is not in accordance with the changing curve of intensity of the standard light, continuously adjusting the second voltage until the light with maximum intensity is collected, and determining the wavelength of the light to be measured according to the maximum light intensity to which the light to be measured is corresponding.

18. The measuring method according to claim 17, wherein before applying the first voltage to one of the substrates in the Fabry-Perot cavity, and applying the second voltage to the other substrate, the measuring method further comprises:
applying the first voltage to one of the substrates;
entering the standard light with standard wavelength into the Fabry-Perot cavity, applying an AC voltage different from the first voltage to the other substrate until the detected intensity of the standard light focused by the lens reaches the maximum;
determining the AC voltage applied to the other substrate as the second voltage when the standard light is corresponding to the maximum intensity.

\* \* \* \* \*